United States Patent
Finley et al.

(10) Patent No.: US 9,556,071 B2
(45) Date of Patent: Jan. 31, 2017

(54) METHODS FOR FORMING AN ELECTRODEPOSITED COATING OVER A COATED SUBSTRATE AND ARTICLES MADE THEREBY

(75) Inventors: James J. Finley, Pittsburgh, PA (US); Donald W. Boyd, Cheswick, PA (US); Gary J. Marietti, Cheswick, PA (US)

(73) Assignee: Vitro, S.A.B. de C.V., Nuevo Leon (MX)

( * ) Notice: Subject to any disclaimer, the term of this patent is extended or adjusted under 35 U.S.C. 154(b) by 1706 days.

(21) Appl. No.: 11/751,328

(22) Filed: May 21, 2007

(65) Prior Publication Data

US 2007/0224404 A1 Sep. 27, 2007

Related U.S. Application Data

(62) Division of application No. 10/805,750, filed on Mar. 22, 2004, now abandoned.

(51) Int. Cl.
*C25D 13/00* (2006.01)
*C03C 17/42* (2006.01)
*C25D 13/20* (2006.01)

(52) U.S. Cl.
CPC .............. *C03C 17/42* (2013.01); *C25D 13/20* (2013.01); *C03C 2218/115* (2013.01); *C03C 2218/156* (2013.01); *Y10T 428/12007* (2015.01)

(58) Field of Classification Search
CPC .............. C03C 17/42; C03C 2218/115; C03C 2218/156; C25D 13/20; Y10T 428/12007
USPC .................................... 204/486–488
See application file for complete search history.

(56) References Cited

U.S. PATENT DOCUMENTS

| | | | | |
|---|---|---|---|---|
| 4,710,426 A | * | 12/1987 | Stephens | 428/336 |
| 4,716,086 A | * | 12/1987 | Gillery et al. | 428/630 |
| 4,864,016 A | * | 9/1989 | DuPont et al. | 528/353 |
| 4,898,789 A | * | 2/1990 | Finley | 428/623 |
| 5,082,739 A | * | 1/1992 | Roy et al. | 501/120 |
| 5,186,802 A | * | 2/1993 | Kadokura | 174/50 |
| 5,718,992 A | * | 2/1998 | Sato et al. | 430/7 |
| 5,843,259 A | * | 12/1998 | Narang et al. | 156/151 |
| 5,942,338 A | * | 8/1999 | Arbab et al. | 428/623 |

* cited by examiner

*Primary Examiner* — Kishor Mayekar
(74) *Attorney, Agent, or Firm* — Andrew C. Siminerio

(57) ABSTRACT

A coated article includes a non-conductive substrate, such as glass. At least one conductive coating is formed over at least a portion of the substrate, such as by chemical vapor deposition or physical vapor deposition. The conductive coating can be a functional coating and can have a thickness in the range of greater than 0 Å to less than 25,000 Å, such as less than 10,000 Å. At least one polymeric coating is electrodeposited over at least a portion of the conductive coating.

28 Claims, 1 Drawing Sheet

METHODS FOR FORMING AN ELECTRODEPOSITED COATING OVER A COATED SUBSTRATE AND ARTICLES MADE THEREBY

CROSS-REFERENCE TO RELATED APPLICATION

This application is a divisional of U.S. patent application Ser. No. 10/805,750 filed Mar. 22, 2004, now abandoned, which is herein incorporated by reference in its entirety.

BACKGROUND OF THE INVENTION

1. Field of the Invention

This invention relates generally to methods for forming at least one electrodeposited coating over a coated substrate, such as forming an electrodeposited coating over a glass substrate having at least one conductive coating, and to articles made thereby.

2. Description of the Currently Available Technology

"Electrodeposition" or "electrocoating" processes are used in a variety of manufacturing fields. In a typical electrocoating process, a metal substrate is immersed in a bath containing an electrocoating composition. The metal substrate serves as a charged electrode in an electrical circuit defined by the electrically charged metal substrate and an oppositely charged counter-electrode. Sufficient current is applied between the electrodes to deposit a substantially continuous, adherent film (electrocoat) of the electrocoating composition onto the surface of the metal substrate.

Electrodeposition has become the primary method for applying corrosion-resistant primers onto metal automotive parts. Additionally, in the field of printed circuit boards, an electrodeposited coating can be applied onto a metal "core" and then portions of the electrodeposited coating ablated in a predetermined pattern to expose sections of the conductive metal core to form electrical circuits. Examples of some known electrodeposition processes are disclosed in U.S. Pat. Nos. 4,333,807 and 4,259,163.

In known electrodeposition processes, the applied electrocoat is typically opaque to hide the underlying substrate. Moreover, the substrate upon which the electrocoat is electrodeposited is typically a solid metal part, such as an automotive or appliance component. Metal parts are well suited to the electrodeposition process since they can be relatively easily charged to function as an electrode in the electrodeposition process.

In a relatively recent development in the automotive industry, organic primer compositions containing metal particles have been developed to provide the underlying metal automotive component with increased corrosion protection. For example, U.S. Pat. No. 4,346,143 describes a zinc-rich organic primer applied over a ferrous metal substrate to provide corrosion protection. The organic primer contains zinc particles or zinc dust, color pigments, and a resinous binder. Since the pigment and zinc particle-containing resinous primer is electroconductive, the primer can be subsequently topcoated using an electrocoating process. U.S. Pat. No. 6,008,462 discloses a weldable resinous coating composition having a resin, a crosslinker, and conductive iron powder particles randomly dispersed in the composition. In these known conductive organic coatings, the metal particles are randomly distributed throughout the organic coating material and the coating is typically applied to a sufficient thickness to hide the underlying metal component and/or to provide corrosion protection for the underlying metal part.

It would be advantageous to utilize the electrocoating process in other coating environments, such as to coat non-conductive substrates, such as glass, ceramic, and tile, just to name a few. However, utilizing non-metal substrates in an electrocoating process presents several problems. For example, electrodeposition requires the ability to electrically charge the substrate to be coated to act as an electrode during the electrocoating process. This is not possible with a non-conductive substrate, such as glass. While conductive organic coatings such as those described above might be applied to a glass substrate to provide an electroconductive surface, such resinous primers could adversely limit the end uses of the resultant coated glass piece. For example, glass panes having a functional coating, such as a solar control coating or an aesthetic coating, are used in automotive and architectural applications. These coated glass panes are typically required to have predefined optical and solar control properties, such as a minimum visible light transmittance, solar infrared reflectance, reflected color, and the like. The presence of a pigmented resinous primer could adversely impact upon the desired optical and/or solar control properties of the coated glass. Additionally, at the elevated temperatures commonly used to coat glass sheets, such metal particle-containing resinous primers could decompose or disintegrate to the point where they would no longer provide a conductive surface suitable for electrodeposition.

Therefore, it would be advantageous to provide a method for electrocoating a substrate, such as but not limited to a glass substrate having a conductive coating, that reduces or eliminates at least some of the drawbacks described above.

SUMMARY OF THE INVENTION

A method of making a coated article comprises providing a substrate and forming at least one conductive coating over at least a portion of the substrate. The conductive coating can be an inorganic coating. The conductive coating can have a thickness in the range of greater than 0 Å to less than 25,000 Å, such as less than 20,000 Å, such as less than 15,000 Å, such as less than 10,000 Å. At least one polymeric coating material can be electrodeposited over at least a portion of the conductive coating. In one nonlimiting embodiment, the conductive coating can be a functional coating, such as a solar control coating, having two or more metal layers. The conductive coating functions as an electrode in the electrodeposition process.

Another method of making a coated article comprises the steps of providing a substrate having at least one conductive coating formed over at least a portion of the substrate, the conductive coating can have an inorganic coating, such as a multilayer inorganic coating, and can have one or more metal layers. The conductive coating can have a thickness in the range of greater than 0 Å to less than 25,000 Å, such as less than 20,000 Å, such as less than 15,000 Å, such as less than 10,000 Å. At least one polymeric coating can be electrodeposited over at least a portion of the conductive coating.

A further method of making a coated article comprises providing a non-conductive first substrate, such as glass or plastic. At least one conductive coating can be formed over at least a portion of the first substrate by a process selected from chemical vapor deposition or magnetron sputter vapor deposition. The conductive coating can be an inorganic coating and/or can have a thickness in the range of greater than 0 Å to less than 25,000 Å, such as less than 20,000 Å, such as less than 15,000 Å, such as less than 10,000 Å. At least one polymeric coating can be electrodeposited over at least a portion of the conductive coating.

A coated article comprises a first substrate, such as a non-conductive substrate, and at least one conductive coating formed over at least a portion of the first substrate. The conductive coating can be an inorganic coating. The conductive coating can have a thickness in the range of greater than 0 Å to less than 25,000 Å, such as less than 20,000 Å, such as less than 15,000 Å, such as less than 10,000 Å. At least one polymeric coating can be electrodeposited over at least a portion of the conductive coating.

Another coated article comprises a non-conductive first substrate, such as glass, with at least one conductive coating formed over at least a portion of the first substrate by a process selected from chemical vapor deposition or magnetron sputter vapor deposition. The conductive coating can be an inorganic coating. The conductive coating can have a thickness in the range of greater than 0 Å to less than 25,000 Å, such as less than 20,000 Å, such as less than 15,000 Å, such as less than 10,000 Å. At least one polymeric coating can be electrodeposited over at least a portion of the conductive coating. A further coated article comprises a substrate; at least one inorganic, conductive coating formed over at least a portion of the substrate; and an electrocoat electrodeposited over the conductive coating.

An additional coated article comprises a substrate; a plurality of conductive coating regions formed over the substrate; and one or more electrocoats selectively electrodeposited over the conductive coating regions.

A process for forming a multilayer composite coating over a substrate includes forming a conductive coating over at least a portion of the substrate by a process selected from chemical vapor deposition or magnetron sputter vapor deposition, and forming at least one polymeric coating over at least a portion of the conductive coating by electrodeposition.

DESCRIPTION OF THE PREFERRED EMBODIMENTS

Figure 1:
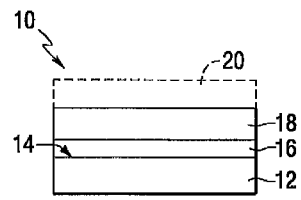
FIG. 1 is a side, sectional view (not to scale) of an exemplary article having an electrodeposited coating incorporating features of the invention.

As used herein, spatial or directional terms, such as "inner", "outer", "above", "below", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 7.6, or 3.4 to 8.1, or 5.5 to 10. Also, as used herein, the terms "deposited over", "applied over", or "formed over" mean deposited, applied, or formed on but not necessarily in contact with the surface. For example, a material "deposited over" a substrate does not preclude the presence of one or more other materials of the same or different composition located between the deposited material and the substrate. Additionally, all references referred to herein are to be understood as being incorporated by reference in their entirety. The term "aesthetic coating" refers to a coating provided to enhance the aesthetic properties of the substrate, e.g., color, shade, hue, or visible light reflectance, but not necessarily the solar control properties of the substrate. However, the aesthetic coating could also provide properties other than aesthetics, such as enhanced solar control properties, for example, ultraviolet (UV) radiation absorption or reflection and/or infrared (IR) absorption or reflection. The terms "visible region" or "visible light" refer to electromagnetic radiation having a wavelength in the range of 380 nm to 780 nm. The terms "infrared region" or "infrared radiation" refer to electromagnetic radiation having a wavelength in the range of greater than 780 nm to 100,000 nm. The terms "ultraviolet region" or "ultraviolet radiation" mean electromagnetic energy having a wavelength in the range of 300 nm to less than 380 nm. The term "film" refers to a region of a coating having a desired or selected composition. A "layer" comprises one or more "films". A "coating" or "coating stack" is comprised of one or more "layers". Molecular weight quantities used herein, whether Mn or Mw, are those determinable from gel permeation chromatography using polystyrene as a standard. Also, as used herein, the term "polymer" refers to oligomers, homopolymers, copolymers, and terpolymers. The term "electrocoat" refers to a coating or coating layer formed by electrodeposition.

An exemplary coated article 10 incorporating features of the invention is shown in FIG. 1. The article 10 includes a substrate 12 which can have at least one major surface 14. At least one conductive coating 16 can be formed over at least a portion of the substrate 12, e.g., over at least a portion of the major surface 14. A polymeric layer, such as a polymeric coating, can be electrodeposited over at least a portion of the conductive coating 16 as described below. Such an electrodeposited coating will hereinafter be referred to as an electrocoat 18. Alternatively, the polymeric layer can be a polyvinyl butyral layer or an acrylic or polymeric sheet, such as a Mylar® sheet. The article 10 can be a monolithic article. By "monolithic" is meant having a single structural substrate or primary ply. By "primary ply" is meant a primary support or structural member. Or, as shown by dashed lines in FIG. 1, another (second) substrate 20 can be provided to form a laminated article, with the conductive coating 16 and the electrocoat 18 located between the two substrates 12, 20. Alternatively, the article can be laminated with either the conductive coating 16 or the electrocoat 18 located between the substrates 12, 20 and the other of the conductive coating 16 or electrocoat 18 on an outer surface (i.e., not between the substrates 12, 20).

In the broad practice of the invention, the substrates 12, 20 can be any desired dimensions, e.g., length, width, shape, or thickness, and can be of any desired material having any desired characteristics, such as opaque, translucent, or transparent to visible light. By "transparent" is meant having a transmittance of visible light through the substrate of greater than 0% up to 100%. By "translucent" is meant allowing electromagnetic energy (e.g., visible light) to pass through the substrate but diffusing this energy such that objects on the side of the substrate opposite to the viewer are not clearly visible. By "opaque" is meant having a visible light transmittance of 0%. Examples of suitable substrates include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); metal substrates, such as but not limited to galvanized steel, stainless steel, and aluminum; ceramic substrates; tile substrates; glass substrates; fiberglass substrates; or mixtures or combinations of any of the above. For example, at least one of the substrates 12, 20 can be conventional untinted soda-lime-silica glass, i.e., "clear glass", or can be tinted or otherwise colored glass, borosilicate glass, leaded glass, tempered, untempered, annealed, or heat-strengthened glass. The glass can be of any type, such as conventional float glass or flat glass, and can be of any composition having any optical properties, e.g., any value of visible radiation transmission, ultraviolet radiation transmission, infrared radiation transmission, and/or total solar energy transmission. Typical automotive-type glasses can have such colors as blue, green, bronze, gray, and non-exclusive examples of these glasses include glasses commercially available from PPG Industries, Inc. of Pittsburgh, Pa., under the names Solex® glass, Solargreen® glass, Solextra® glass, and VistaGray™ glass. The glass can be untempered, heat treated, or heat strengthened glass. As used herein, the term "heat treated" means heated to a temperature sufficient to bend or anneal or temper the glass. The term "heat strengthened" means annealed, tempered, or at least partially tempered. Although not limiting to the invention, examples of glass suitable for the substrates 12, 20 are described in U.S. Pat. Nos. 4,746,347; 4,792,536; 5,240,886; 5,385,872; and 5,393,593. As will be appreciated by one skilled in the art, the substrates 12, 20 do not necessarily have to be of the same material or of the same dimensions (e.g., thickness) or have the same physical or optical characteristics. For example, one of the substrates 12, 20 can be glass and the other substrate can be a polymeric material.

The substrate 12 can be a non-conductive substrate, i.e. a substrate comprising a non-conductor, such as a glass or plastic substrate. For example, a "non-conductive" substrate or "non-conductor" can have a resistivity of greater than $10^5$ ohm-cm. Some plastics are known to have resistivities on the order of $10^{18}$ ohm-cm. The substrate itself can be non-conductive or the substrate can have a non-conductive coating formed thereon. On the other hand, the substrate can be a "conductive" substrate or "conductor". For example, a conductive substrate can have a resistivity of less than $10^5$ ohm-cm, such as less than $10^1$ ohm-cm, such as less than $10^{-2}$ ohm-cm. In one nonlimiting practice of the invention, the substrate 12 is or comprises glass, such as but not limited to a glass sheet, such as a sheet of flat glass or window glass. For conventional automotive transparencies, a glass substrate can typically be up to 10 mm thick, e.g., in the range of 1 mm to 10 mm thick, e.g., less than 10 mm thick, e.g., 1 mm to 5 mm thick, e.g., 1.5 mm to 2.5 mm, e.g., 1.6 mm to 2.3 mm. The substrate 12 can be a flat substrate or can be shaped, bent, or curved. By the term "flat substrate" is meant a substrate lying primarily in a single geometric plane, e.g., such as a piece of flat glass produced by a conventional float glass process. By "shaped" or "bent" is meant a substrate that is not flat.

The conductive coating 16 can be an electrically conductive functional coating. As used herein, the term "functional coating" refers to a coating that modifies one or more physical or optical properties of the substrate on which it is deposited, e.g., optical, thermal, chemical or mechanical properties, and is not intended to be entirely removed from the substrate during subsequent processing. The functional coating can have one or more functional coating films or layers of the same or different composition or functionality. Of course, the conductive coating 16 does not have to be a functional coating other than to provide a conductive surface.

In one nonlimiting practice of the invention, the conductive coating 16 can be a functional coating and/or can have a sheet resistance of less than one million ohms/square ($\Omega/\square$), such as less than 1,000$\Omega/\square$, such as less than 500$\Omega/\square$, such as less than 100$\Omega/\square$, such as less than 30$\Omega/\square$, such as less than 15$\Omega/\square$, such as in the range of 1$\Omega/\square$ to 15$\Omega/\square$. In another exemplary embodiment, the conductive coating 16 can have a sheet resistance of less than 1$\Omega/\square$, such as less than 0.5$\Omega/\square$, such as less than 0.1 $\Omega/\square$, such as less than 0.05$\Omega/\square$, such as less than 0.01$\Omega/\square$, such as less than 0.005$\Omega/\square$, such as in the range of greater than 0$\Omega/\square$ to 0.004$\Omega/\square$, such as 0.001±0.0005$\Omega/\square$. As will be appreciated by one skilled in the art, the conductivity of a coating equals 1/resistivity. For a thin film, resistivity equals the sheet resistance multiplied by the thickness.

The coating 16 can be, for example, an electrically conductive coating used to make heatable windows, such as is disclosed in U.S. Pat. Nos. 5,653,903 and 5,028,759, or a single-film or multi-film coating used as an antenna. Likewise, the coating 16 can be a solar control coating. As used herein, the terms "solar control coating" and/or "low emissivity coating" refer to a coating comprised of one or more layers or films that affect the solar properties of the coated article, such as but not limited to the shading coefficient and/or the amount of solar radiation, for example, visible, infrared (IR), or ultraviolet (UV) radiation, reflected from and/or passing through the coated article. A solar control coating can block, absorb or filter selected portions of the solar spectrum, such as but not limited to the IR, UV, and/or visible spectrums. Examples of solar control coatings that can be used in the practice of the invention are found, for example, in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440 (now abandoned) and 60/355,912 (now expired; U.S. patent application Ser. No. 10/364,089 claiming benefit thereto, now abandoned). Alternatively, the coating 16 can affect the emissivity of the coated article.

Examples of suitable coatings 16, such as functional coatings, for use with the invention are commercially available from PPG Industries, Inc. of Pittsburgh, Pa. under the SUNGATE® and SOLARBAN® families of coatings. Such functional coatings can include one or more anti-reflective coating films comprising dielectric or anti-reflective materials, such as metal alloy oxides, or metal oxides and/or nitrides or oxides and/or nitrides of metal alloys, which are transparent to visible light. The functional coating can also include one or more infrared reflective films comprising a reflective metal, e.g., a noble metal such as gold, copper or silver, or combinations or alloys thereof, and can further comprise one or more primer films or barrier films, such as titanium, nickel, chrome, nickel-chrome alloy, niobium, zirconium, or other primers known in the art, located over and/or under the metal reflective layer(s).

Figure 2:
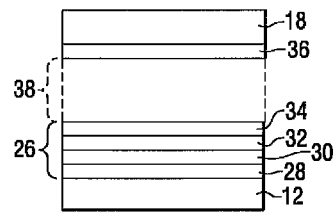
FIG. 2 is a side, sectional view (not to scale) of an exemplary coating suitable for use with the invention.

In one nonlimiting practice, the conductive coating 16 can be a functional coating having one or more coating units 26 as shown in FIG. 2. The coating unit(s) 26 can comprise a first dielectric layer 28, a reflective metal layer 30, an optional primer layer 32, an optional second dielectric layer 34, and an optional protective coating 36. The first and/or second dielectric layers 28, 34 and the reflective metal layer 30 can be of any of the general materials described above and can be of any desired thickness. The coating can include one coating unit 26 or, as shown by dashed lines in FIG. 2, can include one or more other coating units 38 (which can be similar to coating unit 26) formed over the coating unit 26 to form a plurality of coating units on the substrate 12.

Contrary to conventional electrocoating processes, the conductive, e.g., functional, coating 16 can be an inorganic coating. By "inorganic coating" is meant a non-polymeric coating. The inorganic coating can include one or more metal layers 30 and one or more dielectric layers. In one nonlimiting embodiment, the metal layers 30 can be continuous layers, i.e., a solid film of metallic material, rather than metal particles dispersed in a resinous coating. Moreover, the inorganic conductive coating 16 can be much thinner than conventional resinous coatings. In one nonlimiting embodiment, the conductive coating 16 can have a thickness of less than 25,000 Å, such as less than 20,000 Å, such as less than 15,000 Å, such as less than 10,000 Å, such as less than 8,000 Å, such as less than 5,000 Å, such as less than 2,000 Å, such as in the range of greater than 10 Å to 2,000 Å.

The coating 16 can be deposited over the substrate by any conventional method, such as conventional physical vapor deposition (PVD) or chemical vapor deposition (CVD) processes. Suitable deposition processes include, but are not limited to, spray pyrolysis, sol-gel, electron beam evaporation, or vacuum sputtering such as magnetron sputter vapor deposition (MSVD). In one embodiment, the coating 16 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750. In the following discussion, the functional coating is assumed to have been deposited by MSVD.

Figure 3:
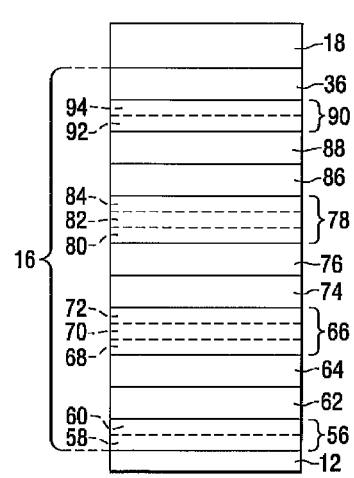
FIG. 3 is a side, sectional view (not to scale) of a particular conductive functional coating suitable for use with the invention.

An exemplary functional conductive coating 16 suitable for the practice of the invention is shown in FIG. 3. The exemplary functional conductive coating 16 can be an inorganic coating and can include a base layer or first dielectric layer 56 deposited over at least a portion of the substrate 12. The first dielectric layer 56 can comprise one or more films of anti-reflective materials and/or dielectric materials, such as but not limited to metal oxides, metal nitrides, metal oxynitrides, oxides or nitrides of metal alloys, doped oxides or nitrides, or mixtures thereof. As used herein, the term "metal" also includes silicon and silicon alloyed with other metals. The first dielectric layer 56 can be transparent to visible light. Examples of suitable metal oxides for the first dielectric layer 56 include, but are not limited to, oxides of titanium, hafnium, zirconium, niobium, zinc, bismuth, lead, indium, tin, and mixtures thereof. These metal oxides can have small amounts of other materials, such as manganese in bismuth oxide, indium-tin oxide, etc. Additionally, oxides or nitrides of metal alloys or metal mixtures can be used, such as oxides containing zinc and tin (e.g., zinc stannate), oxides of indium-tin alloys, silicon nitrides, silicon aluminum nitrides, oxynitrides, or aluminum nitrides. Further, doped metal oxides or nitrides, such as antimony or indium doped tin oxides or nickel or boron doped silicon oxides, can be used. The first dielectric layer 56 can be a substantially single phase film, such as a metal alloy oxide film, e.g., zinc stannate, or can be a mixture of phases composed of zinc and tin oxides or can be composed of a plurality of metal oxide films, such as those disclosed in U.S. Pat. Nos. 5,821,001; 4,898,789; and 4,898,790.

In the illustrated exemplary embodiment, the first dielectric layer 56 comprises a multi-film structure having a first metal alloy oxide film 58 deposited over at least a portion of the major surface of the substrate 12 and a second metal oxide film 60 deposited over the first metal alloy oxide film 58. In one nonlimiting embodiment, the first dielectric layer 56 can have a total thickness of less than or equal to 500 Å, e.g., less than or equal to 300 Å, e.g., less than or equal to 280 Å. For example, the metal alloy oxide-containing film 58 can have a thickness in the range of 100 Å to 500 Å, such as 150 Å to 400 Å, e.g., 200 Å to 250 Å. The metal oxide film 60 can have a thickness in the range of 50 Å to 200 Å, such as 75 Å to 150 Å, e.g., 100 Å. In one nonlimiting embodiment, the metal mixture or alloy oxide-containing film 58 can have a majority of a zinc/tin alloy oxide. The zinc/tin alloy oxide can be that obtained from magnetron sputtering vacuum deposition from a cathode of zinc and tin that can comprise zinc and tin in proportions of 10 wt. % to 90 wt. % zinc and 90 wt. % to 10 wt. % tin. One nonlimiting suitable metal alloy oxide which can be present in the film is zinc stannate. By "zinc stannate" is meant a composition of $Zn_xSn_{1-x}O_{2-x}$ (Formula 1) where x varies in the range of 0 to 1. For instance number x can be greater than 0 and can be any fraction or decimal between greater than 0 to the number 1. For example where x=⅔ Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the film. The metal oxide film 60 can be a zinc-containing film, such as zinc oxide. The zinc oxide film can include other materials to improve the sputtering characteristics of the associated cathode, e.g., the zinc oxide can contain 0 to 20 wt. % tin, e.g., 0 to 15 wt. % tin, e.g., 0 to 10 wt. % tin.

A first heat and/or radiation reflective film or layer 62 can be deposited over the first dielectric layer 56. The first reflective layer 62 can include a reflective metal, such as but not limited to gold, copper, silver, or mixtures, alloys, or combinations containing at least one of these materials. The first reflective layer 62 can have a thickness in the range of 25 Å to 300 Å, e.g., 50 Å to 300 Å, e.g., 50 Å to 150 Å, such as 70 Å to 110 Å, such as 75 Å to 100 Å, e.g., 80 Å to 90 Å. In one nonlimiting embodiment, the first reflective layer 62 comprises silver.

A first primer film 64 can be deposited over the first reflective layer 62. The first primer film 64 can be an oxygen capturing material, such as titanium, that can be sacrificial during the deposition process to prevent degradation or oxidation of the first reflective layer 62 during a sputtering process. The oxygen capturing material can be chosen to oxidize before the material of the first reflective layer 62. In one nonlimiting embodiment, the first primer film 64 can have a thickness in the range of 5 Å to 50 Å, e.g., 10 Å to 40 Å, e.g., 15 Å to 45 Å, such as 25 Å to 45 Å or 15 Å to 25 Å.

An optional second dielectric layer 66 can be deposited over the first primer film 64. The second dielectric layer 66 can comprise one or more metal oxide and/or metal alloy oxide-containing films, such as those described above with respect to the first dielectric layer 56. In the illustrated embodiment, the second dielectric layer 66 includes a first metal oxide layer 68, e.g., zinc oxide, deposited over the first primer film 64. A second metal alloy oxide layer 70, e.g., a zinc stannate layer, can be deposited over the first zinc oxide layer 68. A third metal oxide layer 72, e.g., another zinc oxide layer, can be deposited over the zinc stannate layer 70 to form the multi-film layer 66. Each metal oxide layer 68, 72 of the second dielectric layer 66 can have a thickness in the range of about 50 Å to 200 Å, e.g., 75 Å to 150 Å, e.g., 100 Å. The metal alloy oxide layer 70 can have a thickness in the range of 100 Å to 500 Å, e.g., 200 Å to 500 Å, e.g., 300 Å to 500 Å, e.g., 400 Å.

An optional second reflective layer 74 can be deposited over the second dielectric layer 66. The second reflective layer 74 can include any one or more of the reflective materials described above with respect to the first reflective layer 62. The second reflective layer 74 can have a thickness in the range of 25 Å to 150 Å, e.g., 50 Å to 100 Å, e.g., 80 Å to 90 Å. In the illustrated embodiment, the second reflective layer 74 includes silver. In another embodiment, this second reflective layer 74 can be thicker than each of the first and third infrared reflecting layers.

An optional second primer film 76 can be deposited over the second reflective layer 74. The second primer film 76 can be any of the materials described above with respect to the first primer film 64. The second primer film 76 can have a thickness in the range of about 5 Å to 50 Å, e.g., 10 Å to 25 Å, e.g., 12 Å to 20 Å. In the illustrated embodiment, the second primer film 76 includes titanium.

An optional third dielectric layer 78 can be deposited over the second primer film 76. The third dielectric layer 78 can also include one or more metal oxide and/or metal alloy oxide-containing layers such as discussed above with respect to the first and second dielectric layers 56, 66. In the illustrated exemplary embodiment, the third dielectric layer 78 is a multi-film layer similar to the second dielectric layer 66. For example, the third dielectric layer 78 can include a first metal oxide layer 80, e.g., a zinc oxide layer, a second metal alloy oxide-containing layer 82, e.g., a zinc stannate layer, deposited over the zinc oxide layer 80, and a third metal oxide layer 84, e.g., another zinc oxide layer, deposited over the zinc stannate-containing layer 82. The metal oxide layers 80, 84 can have thicknesses in the range of 50 Å to 200 Å, such as 75 Å to 150 Å, e.g., 100 Å. The metal alloy oxide layer 82 can have a thickness in the range of 100 Å to 500 Å, e.g., 200 Å to 500 Å, e.g., 300 Å to 500 Å, e.g., 400 Å.

The conductive functional coating 16 can further include an optional third reflective layer 86 deposited over the third dielectric layer 78. The third reflective layer 86 can be of any of the materials discussed above with respect to the first and second reflective layers 62, 74. The third reflective layer 86 can have a thickness in the range of 50 Å to 100 Å, e.g., 70 Å to 90 Å, e.g., 75 Å to 85 Å. In the illustrated exemplary embodiment, the third reflective layer 86 includes silver. In one nonlimiting embodiment, when the first, second, and/or third reflective layers have or contain silver, the total amount of silver for the coating 16 can range in the amount of 29 to 44 micrograms per centimeter$^2$ (ugm/cm$^2$), such as 36.5 ugm/cm$^2$.

An optional third primer film 88 can be deposited over the third reflective layer 86. In one nonlimiting embodiment, the third primer film 88 can be of any of the primer materials described above. The third primer film 88 can have a thickness in the range of 5 Å to 50 Å, e.g., 10 Å to 25 Å, e.g., 12 Å to 20 Å. In the illustrated embodiment, the third primer film 88 is titanium.

An optional fourth dielectric layer 90 can be deposited over the third primer film 88. The fourth dielectric layer 90 can be comprised of one or more metal oxide and/or metal alloy oxide-containing layers, such as those discussed above with respect to the first, second, or third dielectric layers. In one embodiment, the fourth dielectric layer 90 is a multi-film layer having a first metal oxide layer 92, e.g., a zinc oxide layer, deposited over the third primer film 88 and a second metal alloy oxide layer 94, e.g., a zinc stannate layer, deposited over the zinc oxide layer 92. The metal oxide layer 92 can have a thickness in the range of 25 Å to 200 Å, such as 50 Å to 150 Å, such as 100 Å. The metal alloy oxide layer 94 can have a thickness in the range of 25 Å to 500 Å, e.g., 50 Å to 250 Å, e.g., 100 Å to 150 Å.

The conductive coating 16 can also include a protective coating 36, e.g., deposited over the optional fourth dielectric layer 90 (if present), to assist in providing protection against mechanical and chemical attack. The protective coating 36 can be of any desired thickness. In one nonlimiting embodiment, the protective coating 36 can have a thickness in the range of 100 Å to 50,000 Å, such as 500 Å to 50,000 Å, e.g., 500 Å to 10,000 Å, such as 100 Å to 3,000 Å, e.g., 100 Å to 2,000 Å, such as 2,000 Å to 3,000 Å. In other nonlimiting embodiments, the protective coating 36 can have a thickness in the range of 100 Å to 10 microns, such as 101 Å to 1,000 Å, or 1,000 Å to 1 micron, or 1 micron to 10 microns, or 200 Å to 1,000 Å, or 5,000 Å to 8,000 Å. Further, the protective coating 36 can be of non-uniform thickness. By "non-uniform thickness" is meant that the thickness of the protective coating 36 can vary over a given unit area, e.g., the protective coating 36 can have high and low spots or areas.

The protective coating 36 can be of any desired material or mixture of materials. In one exemplary embodiment, the protective coating 36 can include one or more metal oxide and/or nitride materials, such as but not limited to, aluminum oxide, silicon oxide, or mixtures thereof. For example, the protective coating 36 can be a single coating layer comprising in the range of 0 wt. % to 100 wt. % alumina and/or 0 wt. % to 100 wt. % silica, such as 5 wt. % to 95 wt. % alumina and 95 wt. % to 5 wt. % silica, such as 10 wt. % to 90 wt. % alumina and 90 wt. % to 10 wt. % silica, such as 15 wt. % to 90 wt. % alumina and 85 wt. % to 10 wt. % silica, such as 50 wt. % to 75 wt. % alumina and 50 wt. % to 25 wt. % silica, such as 50 wt. % to 70 wt. % alumina and 50 wt. % to 30 wt. % silica, such as 35 wt. % to 95 wt. % alumina and 65 wt. % to 5 wt. % silica, e.g., 70 wt. % to 90 wt. % alumina and 10 wt. % to 30 wt. % silica, e.g., 75 wt.

% to 85 wt. % alumina and 15 wt. % to 25 wt. % of silica, e.g., 88 wt. % alumina and 12 wt. % silica, e.g., 65 wt. % to 75 wt. % alumina and 25 wt. % to 35 wt. % silica, e.g., 70 wt. % alumina and 30 wt. % silica, e.g., 60 wt. % to less than 75 wt. % alumina and greater than 25 wt. % to 40 wt. % silica. Other materials, such as aluminum, chromium, hafnium, yttrium, nickel, boron, phosphorous, titanium, zirconium, and/or oxides thereof, can also be present, such as to adjust the refractive index of the coating. In one nonlimiting embodiment, the refractive index of the protective coating 36 can be in the range of 1 to 3, such as 1 to 2, such as 1.4 to 2, such as 1.4 to 1.8. In lieu of or in addition to the oxide materials, the protective coating 36 can comprise nitride and/or oxynitride materials, such as but not limited to nitrides or oxynitrides of aluminum and/or silicon.

Alternatively, the protective coating 36 can be a multilayer coating formed by separately formed layers of metal oxide materials, such as but not limited to a bi-layer formed by one metal oxide-containing layer (e.g., a silica and/or alumina-containing first layer) formed over another metal oxide-containing layer (e.g., a silica and/or alumina-containing second layer). The individual layers of the multilayer protective coating 36 can be of any desired thickness.

In one nonlimiting embodiment, the protective coating 36 can comprise a first layer and a second layer formed over the first layer. In one nonlimiting embodiment, the first layer can comprise alumina or a mixture or alloy comprising alumina and silica. For example, the first layer can comprise a silica/alumina mixture having greater than 5 wt. % alumina, such as greater than 10 wt. % alumina, such as greater than 15 wt. % alumina, such as greater than 30 wt. % alumina, such as greater than 40 wt. % alumina, such as 50 wt. % to 70 wt. % alumina, such as in the range of 70 wt. % to 100 wt. % alumina and 30 wt. % to 0 wt. % silica, such as in the range of 70 wt. % to 95 wt. % alumina and 30 wt. % to 5 wt. % silica. In one nonlimiting embodiment, the first layer can have a thickness in the range of greater than 0 Å to 1 micron, such as 50 Å to 100 Å, such as 100 Å to 250 Å, such as 101 Å to 250 Å, such as 100 Å to 150 Å, such as greater than 100 Å to 125 Å. The second layer can comprise silica or a mixture or alloy comprising silica and alumina. For example, the second layer can comprise a silica/alumina mixture having greater than 40 wt. % silica, such as greater than 50 wt. % silica, such as greater than 60 wt. % silica, such as greater than 70 wt. % silica, such as greater than 80 wt. % silica, such as in the range of 80 wt. % to 90 wt. % silica and 10 wt. % to 20 wt. % alumina, e.g., 85 wt. % silica and 15 wt. % alumina. In one nonlimiting embodiment, the second layer can have a thickness in the range of greater than 0 Å to 2 microns, such as 50 Å to 5,000 Å, such as 50 Å to 2,000 Å, such as 100 Å to 1,000 Å, such as 300 Å to 500 Å, such as 350 Å to 400 Å.

The polymeric layer deposited over the conductive coating 16 can be an acrylic or polymeric sheet, such as a Mylar® sheet. Alternatively, the polymeric layer can be an electrocoat 18 electrodeposited over the conductive coating 16 in any conventional manner, such as but not limited to the method described below. The electrocoat 18 can include any polymeric or resinous material. For example, the "polymeric material" can comprise one polymeric component or can comprise a mixture of different polymeric components, such as but not limited to one or more plastic materials, such as but not limited to one or more thermoset or thermoplastic materials. Useful thermoset components include polyesters, epoxides, phenolics, and polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, EPDM rubber, copolymers and mixtures thereof.

Suitable acrylic polymers include copolymers of one or more of acrylic acid, methacrylic acid and alkyl esters thereof, such as methyl methacrylate, ethyl methacrylate, hydroxyethyl methacrylate, butyl methacrylate, ethyl acrylate, hydroxyethyl acrylate, butyl acrylate and 2-ethylhexyl acrylate. Other suitable acrylics and methods for preparing the same are disclosed in U.S. Pat. No. 5,196,485.

Useful polyesters and alkyds can be prepared in a known manner by condensation of polyhydric alcohols, such as ethylene glycol, propylene glycol, butylene glycol, 1,6-hexylene glycol, neopentyl glycol, trimethylolpropane and pentaerythritol, with polycarboxylic acids such as adipic acid, maleic acid, fumaric acid, phthalic acids, trimellitic acid or drying oil fatty acids. Examples of suitable polyester materials are disclosed in U.S. Pat. Nos. 5,739,213 and 5,811,198.

Useful polyurethanes include the reaction products of polymeric polyols such as polyester polyols or acrylic polyols with a polyisocyanate, including aromatic diisocyanates such as 4,4'-diphenylmethane diisocyanate, aliphatic diisocyanates such as 1,6-hexamethylene diisocyanate, and cycloaliphatic diisocyanates such as isophorone diisocyanate and 4,4'-methylene-bis(cyclohexyl isocyanate). The term "polyurethane" as used herein is intended to include polyurethanes as well as polyureas, and poly(urethane-ureas).

Suitable epoxy-functional materials are disclosed in U.S. Pat. No. 5,820,987.

Useful vinyl resins include polyvinyl acetyl, polyvinyl formal, and polyvinyl butyral.

The electrocoat 18 can be deposited to any desired thickness. In one nonlimiting embodiment, the electrocoat 18 can have a thickness in the range of 0.1 mil to 2 mils, such as 0.2 mils to 1.5 mils, such as 10 microns to 25 microns, such as 20 microns. The electrocoat 18 can have any desired refractive index. In one nonlimiting embodiment, the electrocoat 18 can have a refractive index in the range of 1.4 to 1.7, such as 1.5 to 1.6.

Having described the general structural features of an exemplary embodiment of the invention, an exemplary method of making a coated article in accordance with the invention will now be described.

A substrate 12 is provided. In one practice of the invention, the substrate 12 can be a non-conductive substrate, such as a glass substrate, or can be a conductive substrate with one or more non-conductive coatings formed thereon. At least one electrically conductive coating 16, such as but not limited to an electrically conductive functional coating as described above, is deposited over at least a portion of the substrate 12 in any conventional manner, such as but not limited to PVD (e.g., MSVD), CVD, spraying, spray pyrolysis, or sol gel procedures, just to name a few. The conductive coating 16 can be formed as a layer over all or a portion of the substrate 12, e.g., a surface of the substrate 12, or can be formed in a pattern over the substrate 12.

Once the conductive coating 16 is applied, the coated substrate 12 is electrically charged to function as an electrode in the subsequent electrodeposition process. However, unlike prior electrodeposition processes, in the present invention the substrate 12 itself, if non-conductive or if coated with a non-conductive coating, cannot be effectively charged. Therefore, in the present invention, the conductive coating 16 is electrically charged rather than the substrate 12 itself. For example, a conductive element, such as but not limited to a conductive metal strip or a conductive roller contact, can be placed in contact with the conductive coating 16 and the conductive element connected to a source of electricity. Upon application of electricity to the metal strip, the one or more reflective metal layers in the conductive coating 16 can become electrically charged to act as the electrode in the electrodeposition process.

The substrate 12 with the conductive coating 16 can be placed in contact with an aqueous dispersion of an electrodepositable composition, with the electrically conductive coating 16 acting as an electrode, e.g., an anode or cathode. Upon passage of an electric current between the charged conductive coating 16 and a second electrode, an adherent film of the electrodepositable composition will deposit in a substantially continuous manner to form an electrocoat 18 over the electrically charged conductive coating 16. In one nonlimiting embodiment, electrodeposition can be carried out at a constant voltage ranging from 1 volt to 7,000 volts, such as between 50 and 500 volts and a current density between 1.0 ampere and 15 amperes per square foot (10.8 to 161.5 amperes per square meter).

As will be appreciated by one skilled in the art, the amount of the electrocoating composition applied over the conductive coating 16 depends on several factors, such as the throwpower of the electrocoating composition, the temperature of the electrocoating composition, the voltage applied to the electrodes, and the dwell time of the substrate in the electrocoating composition. As used herein, the term "dwell time" refers to the length of time the coated substrate is positioned in the tank.

An exemplary electrodeposition bath composition useful in the practice of the present invention comprises a resinous phase dispersed in an aqueous medium. The resinous phase includes a film-forming organic component which can comprise an anionic electrodepositable coating composition or a cationic electrodepositable coating composition. The electrodepositable coating composition can include an active hydrogen group-containing ionic resin and a curing agent having functional groups reactive with the active hydrogens of the ionic resin. As used herein, the term "reactive" refers to a functional group that forms a covalent bond with another functional group under suitable reaction conditions.

Nonlimiting examples of anionic electrodepositable coating compositions include those comprising an ungelled, water-dispersible electrodepositable anionic film-forming resin. Nonlimiting examples of film-forming resins suitable for use in anionic electrodeposition coating compositions are base-solubilized, carboxylic acid-containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Yet another suitable electrodepositable anionic resin comprises an alkyd-aminoplast vehicle, i.e., a vehicle containing an alkyd resin and an amine-aldehyde resin. Yet another anionic electrodepositable resin composition comprises mixed esters of a resinous polyol. These compositions are described in detail in U.S. Pat. No. 3,749,657 at col. 9, lines 1 to 75 and col. 10, lines 1 to 13. Other acid functional polymers can also be used such as phosphatized polyepoxide or phosphatized acrylic polymers as are well known to those skilled in the art.

By "ungelled" is meant that the polymer is substantially free of crosslinking and has an intrinsic viscosity when dissolved in a suitable solvent. The intrinsic viscosity of a polymer is an indication of its molecular weight. A gelled polymer, on the other hand, since it is of essentially infinitely high molecular weight, will have an intrinsic viscosity too high to measure.

With reference to the cationic resin, a wide variety of cationic polymers are known and can be used in the compositions of the invention so long as the polymers are "water dispersible," i.e., adapted to be solubilized, dispersed, or emulsified in water. The water dispersible resin is cationic in nature, that is, the polymer contains cationic functional groups to impart a positive charge. The cationic resin may also contain active hydrogen groups.

Nonlimiting examples of suitable cationic resins include onium salt group-containing resins such as ternary sulfonium salt group-containing resins and quaternary phosphonium salt group-containing resins, for example, those described in U.S. Pat. Nos. 3,793,278 and 3,984,922, respectively. Other suitable onium salt group-containing resins include quaternary ammonium salt group-containing resins, for example, those formed from reacting an organic polyepoxide with a tertiary amine salt. Such resins are described in U.S. Pat. Nos. 3,962,165; 3,975,346; and 4,001,101. Also suitable are the amine salt group-containing resins such as the acid-solubilized reaction products of polyepoxides and primary or secondary amines such as those described in U.S. Pat. Nos. 3,663,389; 3,984,299; 3,947,338; and 3,947,339.

Usually, the above-described salt group-containing resins are used in combination with a blocked isocyanate curing agent. The isocyanate can be fully blocked as described in the aforementioned U.S. Pat. No. 3,984,299 or the isocyanate can be partially blocked and reacted with the resin backbone such as is described in U.S. Pat. No. 3,947,338.

Also, one-component compositions as described in U.S. Pat. No. 4,134,866 and DE-OS No. 2,707,405 can be used as the cationic resin. Besides the epoxy-amine reaction products, resins can also be selected from cationic acrylic resins such as those described in U.S. Pat. Nos. 3,455,806 and 3,928,157. Also, cationic resins which cure via transesterification such as described in European Application No. 12463 can be used. Further, cationic compositions prepared from Mannich bases such as described in U.S. Pat. No. 4,134,932 can be used. Also useful in the electrodepositable coating compositions of the present invention are those positively charged resins containing primary and/or secondary amine groups. Such resins are described in U.S. Pat. Nos. 3,663,389; 3,947,339; and 4,115,900. U.S. Pat. No. 3,947,339 describes a polyketimine derivative of a polyamine such as diethylenetriamine or triethylenetetraamine with the excess polyamine vacuum stripped from the reaction mixture. Such products are described in U.S. Pat. Nos. 3,663,389 and 4,116,900.

In one nonlimiting embodiment of the present invention, the cationic resins suitable for inclusion in the electrodepositable coating compositions useful in the methods of the present invention are onium salt group-containing acrylic resins.

The cationic resin described immediately above is typically present in the electrodepositable coating compositions in amounts of 1 to 60 weight percent, such as 5 to 25 weight percent based on total weight of the composition.

As previously discussed, the electrodepositable coating compositions that are useful in the methods of the present invention typically further comprise a curing agent which contains functional groups which are reactive with the active hydrogen groups of the ionic resin.

Aminoplast resins, which are the preferred curing agents for anionic electrodeposition, are the condensation products of amines or amides with aldehydes. Nonlimiting examples of suitable amine or amides are melamine, benzoguanamine, urea and similar compounds. Generally, the aldehyde employed is formaldehyde, although products can be made from other aldehydes, such as acetaldehyde and furfural. The condensation products contain methylol groups or similar alkylol groups depending on the particular aldehyde employed. These methylol groups can be etherified by reaction with an alcohol. Various alcohols employed include monohydric alcohols containing from 1 to 4 carbon atoms such as methanol, ethanol, isopropanol, and n-butanol, with methanol being preferred. Aminoplast resins are commercially available from American Cyanamid Co. under the trademark CYMEL® and from Monsanto Chemical Co. under the trademark RESIMENE®.

The aminoplast curing agents are typically utilized in conjunction with the active hydrogen-containing anionic electrodepositable resin in amounts ranging from 5 percent to 60 percent by weight, such as from 20 percent to 40 percent by weight, the percentages based on the total weight of the resin solids in the electrodeposition bath.

Suitable curing agents for cationic electrodepositable coating compositions are blocked organic polyisocyanates. The polyisocyanates can be fully blocked as described in U.S. Pat. No. 3,984,299 column 1 lines 1 to 68, column 2 and column 3 lines 1 to 15, or partially blocked and reacted with the polymer backbone as described in U.S. Pat. No. 3,947,338 column 2 lines 65 to 68, column 3 and column 4 lines 1 to 30. By "blocked" is meant that the isocyanate groups have been reacted with a compound so that the resultant blocked isocyanate group is stable to active hydrogens at ambient temperature but reactive with active hydrogens in the film forming polymer at elevated temperatures, usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates such as triisocyanates can be used. An example would include triphenylmethane-4,4',4"-triisocyanate. Isocyanate prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the cationic resin in amounts ranging from 1 weight percent to 65 weight percent, such as from 5 weight percent to 45 weight percent, based on the weight of the total resin solids present composition.

The aqueous compositions can be in the form of an aqueous dispersion. The term "dispersion" refers to a two-phase transparent, translucent, or opaque resinous system in which the resin is in the dispersed phase and the water is in the continuous phase. The average particle size of the resinous phase is generally less than 1.0 and usually less than 0.5 microns, such as less than 0.15 micron.

The concentration of the resinous phase in the aqueous medium can be at least 1 percent, such as from 2 to 60 percent by weight based on total weight of the aqueous dispersion. When the compositions of the present invention are in the form of resin concentrates, they generally have a resin solids content of 20 to 60 percent by weight based on weight of the aqueous dispersion.

Electrodeposition compositions useful in the methods of the present invention are typically supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, which generally includes one or more pigments, a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

The electrodeposition composition of the present invention has a resin solids content usually within the range of 5 to 25 percent by weight based on total weight of the electrodeposition composition.

As aforementioned, besides water, the aqueous medium can contain a coalescing solvent. Useful coalescing solvents include hydrocarbons, alcohols, esters, ethers and ketones. Suitable coalescing solvents include alcohols, polyols, and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. The amount of coalescing solvent is generally between 0.01 and 25 percent and, when used, such as from 0.05 to 5 percent by weight based on total weight of the aqueous medium.

As discussed above, a pigment composition and, if desired, various additives such as surfactants, wetting agents or catalyst can be included in the dispersion. The pigment composition may be of the conventional type comprising pigments, for example, iron oxides, strontium chromate, carbon black, coal dust, titanium dioxide, talc, barium sulfate, as well as color pigments such as cadmium yellow, cadmium red, chromium yellow, and the like.

The pigment content of the dispersion is usually expressed as a pigment-to-resin ratio. In the practice of the invention, when pigment is employed, the pigment-to-resin ratio is usually within the range of 0.02 to 1:1. The other additives mentioned above are usually in the dispersion in amounts of 0.01 to 3 percent by weight based on weight of resin solids.

After the electrocoat 18 has been applied by electrodeposition, it can be cured in any conventional manner, such as by baking at elevated temperatures ranging from 90° C. to 430° C. for a period ranging from 60 to 1800 seconds. The dryer can be any of a variety of curing ovens, both electric and gas powered, that are well known in the art for use on coating lines. Alternatively, the coating can be cured using infrared curing techniques as are well known in the art, typically for a period ranging from 45 to 600 seconds or a time sufficient to obtain a peak metal temperature ranging from 250° F. to 500° F. (120° C. to 257° C.). In one embodiment, the electrodeposited coating can be dried by driving substantially all the solvent and/or water from the coating either by evaporation at ambient temperature or by forced drying at elevated temperatures. For curable coating compositions, the electrocoat can be cured or at least partially cured to provide a crosslink density of the crosslinkable components, i.e., the degree of crosslinking, ranging from 5% to 100% of complete crosslinking, such as 35% to 85%, such as 50% to 85% of full crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen. This method determines the glass transition temperature and crosslink density of free films of coatings or polymers. These physical properties of a cured material are related to the structure of the crosslinked network.

Generally, the electrodepositable coating compositions which are useful in the methods of the present invention are applied under conditions such that a substantially continuous coating having a dried film thickness ranging from 0.1 to 1.8 mils (2.54 to 45.72 micrometers), such as 0.15 to 1.6 mils (30.48 to 40.64 micrometers), is formed over the conductive functional coating.

Figure 4:
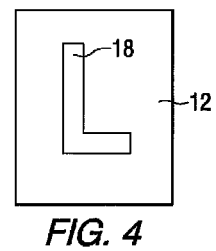
FIG. 4 is a plan view (not to scale) of an exemplary article of the invention having a coating over a portion of the substrate such that the subsequently applied electrocoat forms a pattern.

As described above and shown in FIGS. 2 and 4, the conductive coating 16 can be formed over a portion of the non-conductive substrate 12 such that the subsequently deposited electrocoat 18 is deposited on the conductive coating 16 to form a pattern, such as but not limited to letters, numbers, or shapes, on the substrate. For example, a mask can be used to cover portions of the substrate 12 prior to depositing the conductive coating 16. Alternatively, the conductive coating 16 can be applied over all or a portion of the substrate 12 and then portions of the conductive coating 16 removed, such as by laser deletion, prior to electrocoating.

Figure 5:
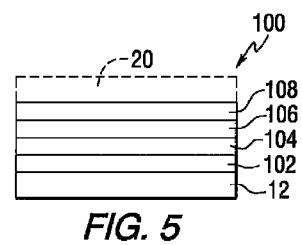
FIG. 5 is a side, sectional view (not to scale) of another exemplary coated article incorporating features of the invention.

Having described the general concepts of the invention, it will be appreciated that the invention is not limited to the exemplary embodiments described above. For example, FIG. 5 shows another article 100 incorporating features of the invention. The article 100 includes a substrate 12, e.g., a glass substrate, having a first conductive, e.g., functional, coating 102 deposited over at least a portion of the substrate 12 in any conventional manner, such as by PVD or CVD. A first electrocoat 104 is deposited over the first conductive coating 102. Another, e.g., a second, conductive coating 106 can be deposited over at least a portion of the first electrocoat 104 and another electrocoat, e.g., a second electrocoat 108, can be deposited over at least a portion of the second conductive coating 106. An optional second substrate can be attached to the coated substrate, such as by the second electrocoat 108. The first and second conductive coatings 102, 106 can be of the same or different composition. The first and second electrocoats 104, 108 can be of the same or different composition. For example, the first and second electrocoats 104, 108 can be of the same or different refractive index or the same or different transmittance or color. Additionally, the first and second conductive coatings 102, 106 need not be formed by the same process. For example but not to be considered as limiting, the first conductive coating 102 can be deposited by one process, such as PVD (e.g., MSVD) or CVD and the second conductive coating 106 can be formed by a different process, such as but not limited to sol-gel, spraying, or dipping.

Figure 6:
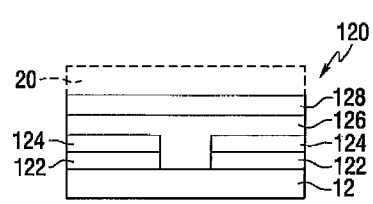
FIG. 6 is a side, sectional view (not to scale) of an additional exemplary coated article incorporating features of the invention.

Another nonlimiting article 120 incorporating features of the invention is shown in FIG. 6. The article 120 includes a substrate 12, such as a glass substrate, having a first conductive coating 122 deposited over at least a portion of the substrate 12. The first conductive coating 122 can be formed in a pattern or over different portions of the substrate surface. A first electrocoat 124 is deposited over the first conductive coating 122. A second conductive coating 126 can be deposited over the first electrocoat 124 and can fill in areas not covered by the first conductive coating 122 or first electrocoat 124. A second electrocoat 128 can be deposited over the second conductive coating 126. The first and second electrocoats 124, 128 (and/or the first and second conductive coatings 122, 126) can be the same or different composition. For example, the first and second electrocoats 124, 128 can be of the same or different refractive index or the same or different transmittance or color.

Figure 7:
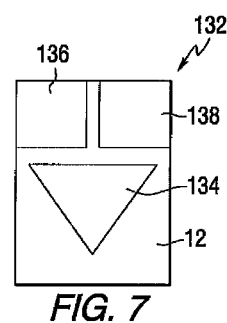
FIG. 7 is a plan view (not to scale) of an exemplary coated article of the invention.

A further nonlimiting article 132 is shown in FIG. 7. The article 132 includes at least one substrate 12, such as a glass substrate. The article 132 can have a plurality of electrocoated regions, such as regions 134, 136, and 138, having the same or different electrocoats. For example, conductive coatings (such as those described above) can be deposited over discrete regions or areas of the substrate. The regions of conductive coatings can be electrically isolated from each other by gaps or breaks between the different coating regions. The conductive coatings can be the same or different to provide the same or different optical or mechanical performance. Alternatively, one or more conductive coatings can be applied over portions of the substrate 12 using conventional masking techniques or a conductive coating can be applied over at least a portion of the substrate 12 and then areas of the coating can be electrically isolated from each other by removing portions of the conductive coating, such as by laser deletion, to form gaps or breaks between the different coating areas.

Once the electrically isolated conductive coating areas are formed, the isolated coating areas can be selectively electrocoated to apply electrocoats over the isolated coating areas to form the electrocoated regions 134, 136, and 138. For example, the conductively coated substrate can be placed in a first electrocoat bath and one of the electrically isolated coating areas can be electrically charged, such as by contacting that coating area with an electrical contact roller. Since the coating areas are electrically isolated, the electrodepositable coating composition will only deposit on the charged conductive coating area, e.g., to form the electrocoated region 134. In similar manner, the substrate can then be placed in other electrocoat baths and the other conductive coating areas selectively charged to form the other electrocoated regions 136 and 138. The electrocoat compositions used to form the electrocoated regions can have the same or different optical and/or mechanical properties, such as color, electromagnetic energy transmittance or reflectance, and the like.

The invention can be practiced in a wide variety of fields. For example, an article 10 (see FIG. 1) can be utilized as a door for an appliance, such as a conventional microwave oven. The article 10 (without the optional second substrate 20) can be placed in a door frame with the electrocoat 18 facing the interior of the microwave. Alternatively, the article 10 can form the microwave door (without the door frame), with hardware such as hinges, door handle, and door lock attached directly to the article 10.

In another nonlimiting embodiment, a non-conductive sheet, such as glass or plastic, can be coated with a conductive coating as described above. Areas of the coating can be electrically isolated from one another (such as by masking during coating or deleting portions of the applied coating). One or more of the electrically isolated areas can then be electrocoated in any conventional manner to form an electrocoat over selected conductive coating areas. The areas of the conductive coating not electrocoated can then be removed, such as by mechanical or laser deletion or by a solvent. Optionally, the electrocoat can then be removed, such as by an appropriate solvent, to leave the underlying conductive coating areas on the substrate.

In a further nonlimiting embodiment, electrically isolated conductive coating areas can be formed over a substrate as described above. A first electrocoat having a first composition can be applied over one or more of the isolated conductive coating areas and a second electrocoat having a second composition can be applied over one or more other coating areas. The first electrocoat can have a different solubility to a particular solvent than the second electrocoat such that the first or second electrocoat can be removed (e.g., dissolved) to expose the underlying conductive coating while leaving the other electrocoat remaining.

Illustrating the invention are the following Examples, which are not to be considered as limiting the invention to their details.

EXAMPLES

Example 1

This Example illustrates the application of commercially available electrocoats over two conductive coatings.

In all of the following Examples, coating 1 was a SUN-GATE® coating (commercial designation SAO3) commercially available from PPG Industries, Inc. of Pittsburgh, Pa. This coating includes two layers of metallic silver (10 nm each) sandwiched between dielectric layers of 30 nm to 60 nm. The structure of this commercially available coating can generally be described as glass/dielectric (30 nm)/silver (10 nm)/dielectric (60 nm)/silver (10 nm)/dielectric (30 nm)/titania (3 nm).

Coating 2 was a solar control coating having three layers of metallic silver separated by dielectric layers. The structure of coating 2 is described in U.S. patent application Ser. No. 10/364,089 filed Feb. 11, 2003 and published on Sep. 25, 2003 as U.S. Publication No. US 2003-0180547 A1, now abandoned. A protective overcoat comprising a bilayer of alumina and silica (total thickness of 60 nm to 80 nm) was applied over coating 2. The protective overcoat is described in U.S. patent application Ser. No. 10/422,096 filed Apr. 24, 2003, presently pending.

The coatings 1 and 2 were deposited on 3 mm thick float glass using a conventional MSVD process. The coated substrates were heated to 1100° F. and then allowed to cool to room temperature before application of the electrocoats as described below.

Four commercially available electrocoating compositions were used in this Example. The coating compositions were:

E1-Clear Duraprime® electrocoat (a durable cationic electrocoating composition) commercially available from PPG Industries, Inc.;

E2-EC 2800® coating (a cationic acrylic urethane coating) commercially available from PPG Industries, Inc.;

E3-Unpigmented W780® coating (epoxy-urethane coating) commercially available from PPG Industries, Inc.; and E4-P930® clearcoat (an unpigmented cationic acrylic urethane) commercially available from PPG Industries, Inc.

The samples with the MSVD applied coatings were electrocoated using a conventional laboratory electrocoating apparatus. The samples were electrocoated at the conditions listed in Table 1. Table 1 also lists the visual appearance of the electrocoated substrates.

TABLE 1

| Sample No. | Conductive Coating | Electrocoat | Max. (V) | Max. (I) | Time (s) | Bath (° F./° C.) | Coulombs | Estimated Thickness (microns) | Cure cycle (° F./° C. mins) | Visual observations |
|---|---|---|---|---|---|---|---|---|---|---|
| 1 | Coating 2 | E1 | 120 | 0.30 | 120 | 95/35 | 9.5-10.9 | 21-24 | 350° F./176° C. 20 minutes | Hazy - frosted e-coat; silverish spots in MSVD coating |
| 2 | Coating 1 | E1 | 120 | 0.30 | 120 | 95/35 | 10.5-11.0 | 23-24 | 350° F./176° C. 20 minutes | Hazy - frosted e-coat; fewer silverish spots in MSVD coating |
| 3 | Coating 2 | E2 | 80 | 0.25 | 90 | 85/29 | 6.9-8.3 | 9-11 | 325° F./163° C. 20 minutes | Orange peel; MSVD coating good |
| 4 | Coating 1 | E2 | 80 | 0.25 | 90 | 85/29 | 13.6-14.7 | 17-19 | 325° F./163° C. 20 minutes | Orange peel; sandy haze appearance |
| 5 | Coating 2 | E3 | 120 | 0.30 | 120 | 90/32 | 9.8-11.3 | 14-16 | 355° F./179° C. 20 minutes | Orange peel; light silverish spots in MSVD coating |
| 6 | Coating 1 | E3 | 120 | 0.30 | 120 | 90/32 | 9.8-10.0 | 14 | 355° F./179° C. 20 minutes | Orange peel; MSVD coating good |
| 7 | Coating 2 | E4 | 80 | 0.25 | 90 | 80/26 | 8.1-10.1 | 17-22 | 365° F./185° C. 20 minutes | Orange peel; light silverish spots in MSVD coating |
| 8 | Coating 1 | E4 | 120 | 0.25 | 90 | 80/26 | 8.2-8.8 | 18-19 | 365° F./185° C. 20 minutes | Orange peel; MSVD coating good |

Samples 1-8 were then subjected to various chemical and mechanical durability tests. The tests were:

Sodium Chloride—2.5% NaCl by weight in de-ionized water; exposure by immersion for 24 hours at room temperature (65-75° F./18-24° C.).

Acetic Acid—1 normal concentration in de-ionized water (pH approximately 2.4); exposure by immersion for 24 hours at room temperature (65-75° F./18-24° C.).

Ammonium Hydroxide–1 normal concentration $NH_4OH$ in de-ionized water (pH approximately 12.2); exposure by submersion for 24 hours at room temperature (65-75° F./18-24° C.).

Dart 210 Detergent—1% by volume in de-ionized water (pH approximately 2.9); exposure by immersion for 24 hours at room temperature (65-75° F./18-24° C.); Dart 210 is a detergent commercially available from Madison Chemical Company.

Boiling de-ionized water—exposure by immersion for 2 hours.

Cleveland Condensation Chamber (CCC)—continuous condensation at 140° F. (60° C.) for 91 hours. A conventional "tape pull test" was then conducted in which a piece of Scotch®-brand tape was contacted with the coated surface and then pulled off to test coating adhesion.

Taber Abrasion—Abrade samples 10 cycles using a Teledyne Taber Abraser instrument set up with CS-10F abrasive wheels, each wheel loaded with 500 grams. Microscopic pictures were taken of the abrasion track and processed by a Photoshop program to measure the scratch density (total length of all scratches per area).

Thermal Stability—exposure 66 hours at 275° F. (135° C.) in a Blue M Stabil-Therm Gravity oven. Color was measured before and after exposure using a BYK Gardner TCS Plus Spectrophotometer. Color change is expressed by $\Delta E_{cmc}$ (Illuminant D6500, Observer 10 degree).

Q-foci (Simulated Lardy Test)—Time duration=60 cycles/1440 hours, Solution acidity=pH of 4.0 (Sulfuric acid), Electrolyte Solution=1%±0.025% NaCl, Operating temperature=40° C., De-Ionized water used.

Exposure Cycle:

| Step 1: | Salt fog at 40° C. | 20 minutes |
| Step 2: | 100% RH at 40° C. | 3 hours 40 minutes |
| Step 3: | Dry-off at 40° C. | 4 hours |
| Step 4: | 100% RH at 40° C. | 4 hours |
| Step 5: | Dry-off at 40° C. | 4 hours |
| Step 6: | 100% RH at 40° C. | 4 hours |
| Step 7: | Dry-off at 40° C. | 4 hours |
| Step 8: | Final step - go to step 1. | |

The results of these tests are shown in Table 2 below.

By "pass" is meant that the samples appeared to be of sufficient quality for commercial application.

TABLE 2

| Sample Nos. | NaCl | Acetic Acid | NH$_4$OH | Dart 210 | Boil | CCC | Taber | Thermal Stability |
|---|---|---|---|---|---|---|---|---|
| 1/2 | pass | pass | pass | pass | pass | e-coat bubbling up; tape pull removes e-coat | not measured | slightly yellow (cmc [E=4.90]) |
| 3/4 | pass | pass | some edge delamination | pass | pass | bottom corners of sample bubbled up; tape pull removes spot areas of e-coat | 40 mm$^{-1}$ | no visual change (cmc [E=1.50]) |
| 5/6 | pass | pass | pass | pass | pass | e-coat bubbling up; tape pull removes e-coat | 42 mm$^{-1}$ | heavily yellowed (cmc [E=7.55]) |
| 7/8 | pass | pass | pass | pass | pass | e-coat bubbling up; tape pull removes e-coat near edge of sample and spot areas | 38 mm$^{-1}$ | no visual change (cmc [E=1.12]) |

Another set of coated systems was then exposed to a Q-fog (simulated Lardy) test. Laminated and monolithic (non-laminated) articles with and without an electrocoat were tested and the results are shown in Table 3 below. For the laminates, replicates of the coated samples 1-8 above were laminated to another piece of 3 mm thick float class using a conventional polyvinylbutyral adhesive. For the laminated articles with and without the electrocoat, penetration was measured inwardly from the edge of the article.

TABLE 3

| | | | Q-fog (Simulated Lardy) | | | |
|---|---|---|---|---|---|---|
| | | | Laminates (1430 hours exposure) | | Monolithic (718 hours exposure) | |
| Sample No. | MSVD Coating | Electrocoat | Penetration into MSVD Coating w/o Electrocoat | Penetration with Electrocoat | MSVD Coating Damage w/o Electrocoat | Damage with Electrocoat |
| 1 | Coating 2 | E1 | 1/2" (1.3 cm) | 0 to 1/16" (0.16 mm) | severe | 5x corrosion spots of coating 1 |
| 2 | Coating 1 | E1 | 3/8" (0.9 cm) | None | severe | many corrosion spots |
| 3 | Coating 2 | E2 | 1/2" (1.3 cm) | None (pass for automotive) | destroyed | 3/8" (0.9 mm) on bottom edge and minor spot corrosion |
| 4 | Coating 1 | E2 | 1/4" (0.6 cm) | 0 to 1/16" (0.16 mm) (pass for automotive) | destroyed | electrocoat flaked off during cleaning but coating not corroded |
| 5 | Coating 2 | E3 | 1/2" (1.3 cm) | None | destroyed | bad corrosion; extensive spots; separation |
| 6 | Coating 1 | E3 | 1/4" (0.6 cm) | 0 to 1/16" (0.16 mm) | destroyed | numerous spots; 1/16" (0.16 mm) penetration at edges |

TABLE 3-continued

| | | | Q-fog (Simulated Lardy) | | | |
|---|---|---|---|---|---|---|
| | | | Laminates (1430 hours exposure) | | Monolithic (718 hours exposure) | |
| Sample No. | MSVD Coating | Electrocoat | Penetration into MSVD Coating w/o Electrocoat | Penetration with Electrocoat | MSVD Coating Damage w/o Electrocoat | Damage with Electrocoat |
| 7 | Coating 2 | E4 | 1/2" (1.3 cm) | Laminate failure - no conclusion | destroyed | very extensive corrosion, 3/16" (0.5 mm) at edges |
| 8 | Coating 1 | E4 | 1/4" (0.6 cm) | 0 to 1/8" | destroyed | no corrosion spots, 1/16" (0.16 mm) at edges - good |

Example 2

Based on the above results, two coating combinations were selected for further testing. These were the E4 electrocoat on coating 1 and the E2 electrocoat on coating 2. Two samples (9 and 10 below) having these coating combinations were prepared under the conditions shown in Table 4 below.

TABLE 4

| Sample | Conductive Coating | Electrocoat | Max (V) | Max (I) | Time (s) | Bath °F./°C. | Coulombs | Thickness (microns) | Cure Cycle |
|---|---|---|---|---|---|---|---|---|---|
| 9 | 1 | E4 | 80 | 0.25 | 90 | 80/26 | 8.22-9.47 | 17.6-20.3 | 365° F./163° C. 20 mins |
| 10 | 2 | E2 | 80 | 0.25 | 90 | 85/29 | 6.73-7.23 | 8.5-9.2 | 325° F./163° C. 20 mins |

These samples were then subjected to the same chemical and mechanical tests described above and the results are shown in Table 5 below.

TABLE 5

| Sample | NaCl | Acetic Acid | NH$_4$OH | Dart 210 | Boil | CCC | Taber | Thermal Stability | Q-fog |
|---|---|---|---|---|---|---|---|---|---|
| 9 | Pass | Pass | Pass | Pass | Pass | Pass | 26 mm$^{-1}$ | CMC ☐E = 0.46 for R1 surface | Spot corrosion at pin holes; non-electrocoated area destroyed |
| 10 | Pass | Pass | Pass | Pass | Pass | Pass | 41 mm$^{-1}$ | CMC ☐E = 1.05 for R1 surface | Few corrosion spots; non-electrocoated area destroyed |

Example 3

Next, coated articles incorporating features of the invention were tested using larger size glass substrates. In the following examples, the substrates were of two sizes:

Size 1—3.15 mm×12.5 inch (31.7 cm)×28 inch (71 cm) or

Size 2—3.15 mm×12.5 inch (31.7 cm)×25 inch (64 cm).

The coating combination selected for testing was coating 2 having the E2 commercial electrocoat. Samples 11-13 were prepared as shown in Table 6 below.

TABLE 6

| Sample | Conductive Coating | Electrocoat | Sheet size | Max (I) | Max (V) | Time (sec) | E-coat Temp. | Coulombs | Thickness (microns) | Visual Observation |
|---|---|---|---|---|---|---|---|---|---|---|
| 11 | 2 | E2 | 1 | 1.95 | 100 | 180 | 85° F. (29° C.) | 191.9 | 28 | No delamination |
| 12 | 2 | E2 | 1 | 1.95 | 80 | 100 | 85° F. (29° C.) | 100.4 | 17 | No delamination |
| 13 | 2 | E2 | 2 | 1.95 | 100 | 130 | 85° F. (29° C.) | 134.9 | 27 | No delamination |

The results of the above experiment show that the electrocoating process utilized on a larger surface area conductive coating is generally equivalent to the results from the smaller samples reported above. This demonstrates the production feasibility of utilizing the invention on commercially typical glass sizes. The larger size coated glass appeared equivalent in coating quality to the smaller scale samples described above.

Example 4

Next, electrodeposition over a conductive coating on bent glass substrates was examined. A 3.5 mm clear glass substrate was coated with coating 2 described above and then bent on a bending iron for 7½ minutes at 1300° F. (703° C.) to form a complex, i.e. "U-shaped", bend with a maximum radius of curvature of 4.75 inches (12 cm). One substrate was then coated on the concave side of the bend with E2 electrocoat under the conditions shown in Table 7 and another such substrate was electrocoated with E2 on the convex side of the bend under the conditions shown in Table 7 below.

Example 5

The following example illustrates the viability of electrically isolating areas of the conductive coating and then selectively electrocoating those areas.

The substrates used in this example were clear float glass substrates having thicknesses in the range of 2.07 mm to 3.15 mm. The conductive coatings as set forth in Table 8 below were applied using a conventional MSVD process and then sections of the conductive coating were electrically isolated by deleting portions of the conductive coating using a model M-300 laser commercially available from Universal Laser Systems, Inc. of Scottsdale, Ariz. The laser was a 25 watt carbon dioxide laser with a 125 micron beam width. The "E4 red" and "E4 black" electrocoats in this example are the same as the E4 electrocoat described above except that red or black pigment, respectively, was added to the electrocoating composition to provide a final red or black color to the coating.

TABLE 7

| | | | Electrocoat process | | | | | |
|---|---|---|---|---|---|---|---|---|
| Sample | Sample size | Coating | Coating Max. Temp. | Max (I) | Max volts | Time (sec.) | E-coat temp. | Coulombs | Thickness (microns) |
| 14 | 78 sq. in. (500 sq. cm) | 2 | 1232° F./ 666° C. | 0.9 | 100 | 180 | 85° F./ 29° C. | 76.2 | 24 |
| 15 | 78 sq. in. (500 sq. cm) | 2 | 1272° F./ 688° C. | 0.9 | 100 | 180 | 85° F./ 29° C. | 60.2 | 19 |

The coated substrates were then visually inspected. Both of the substrates appeared to have a uniform electrocoat formed thereon. The coated curved substrates had the same visual characteristics as far as coating smoothness as the flat panels described above. This is different from conventional spray-applied coatings that tend to puddle or run off. These spray-applied coatings tend to be thinner at the edges and thicker in low spots of the substrate.

TABLE 8

| | | | | Electrocoat process | | | | | |
|---|---|---|---|---|---|---|---|---|---|
| Sample ID | Coating | Coating max Temp. | Electrocoat | Max (I) | Max Volts | Time (sec.) | E-coat temp. | Coulombs | Thickness (microns) |
| 16 | 1 | not heated | E4 | 0.25 | 80 | 90 | 80° F./27° C. | 8.47 | 21 |
| 17 | 2 | not heated | E2 | 0.25 | 80 | 90 | 80° F./27° C. | 6.71 | 10 |
| 18 | 2 | 1185° F./640° C. | E2 | 0.25 | 80 | 90 | 80° F./27° C. | 8.5 | 12 |
| 19 | 2 | not heated | E4 Red | 0.25 | 80 | 90 | 80° F./27° C. | 6.46 | 11 |
| 20 | 2 | 1185° F./640° C. | E4 Red | 0.25 | 80 | 90 | 80° F./27° C. | 7.83 | 13 |
| 21 | 1 | not heated | E4 Red | 0.25 | 80 | 90 | 80° F./27° C. | 6.74 | 12 |
| 22 | 1 | 1130° F./609° C. | E4 Red | 0.25 | 80 | 90 | 80° F./27° C. | 7.89 | 14 |
| 23 | 2 | not heated | E4 Black | 0.25 | 120 | 140 | 80° F./27° C. | 11.81 | 20 |
| 24 | 1 | not heated | E4 Black | 0.25 | 120 | 140 | 80° F./27° C. | 11.13 | 19 |
| 25 | 1 | 1130° F./609° C. | E4 Black | 0.25 | 120 | 140 | 80° F./27° C. | 12.53 | 21 |

It was observed that the electrocoat did not coat the laser deleted areas (i.e., those areas of the substrate upon which the conductive coating had been deleted). The width of the deleted area had been adjusted between 0.12 mm to 1 cm and none of these deleted width areas had an accumulation of electrocoat thereon. There was also no electrocoat deposited in the electrically isolated area of the conductive coating (i.e., that area of the conductive coating that was not in electrical contact during the electrocoat process).

While in the above example a laser was used to delete the conductive coating, it will be understood by one of ordinary skill in the art that any conventional deletion means, such as but not limited to mechanical scribes, abrasive cloths, wheels, chemical removal, soluble materials applied before the conductive coating, etc., could also be used to delete areas of the conductive coating or the conductive coating could be deposited in discrete areas by masking the substrate prior to deposition of the conductive coating.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A method of making a coated article, comprising the steps of:
    providing a substrate;
    forming at least one conductive coating over at least a portion of the substrate, the conductive coating having a thickness in the range of greater than 0 Å to less than 25,000 Å; and
    forming at least one polymeric coating over at least a portion of the conductive coating by an electrodeposition process, wherein the polymeric coating comprises a cationic acrylic urethane, and wherein the conductive coating functions as an electrode in the electrodeposition process,
    wherein said conductive coating comprises a first dielectric layer, and a first metal layer, said first dielectric layer being interposed between said substrate and said first metal layer,
    said first dielectric layer comprising a first metal alloy oxide film and a second metal oxide film, said first metal alloy oxide film being interposed between said substrate and said second metal oxide film,
    said first metal alloy oxide film and said second metal oxide film independently selected from the group consisting of oxides of titanium, hafnium, zirconium, niobium, zinc, bismuth, lead, indium, tin, zinc/tin alloy, and combinations thereof, and
    said coated article is free of a resinous primer.

2. The method of claim 1, wherein the substrate is made of a non-conductive material.

3. The method of claim 1, wherein the substrate is selected from glass and plastic.

4. The method of claim 1, wherein the substrate is tempered or annealed glass.

5. The method of claim 1, wherein the substrate is a bent substrate.

6. The method of claim 1, wherein the substrate is a bent substrate and the method includes:
    forming the conductive coating over at least a portion of the bent substrate; and
    forming the polymeric coating over at least a portion of the conductive coating.

7. The method of claim 1, including:
    bending the substrate to a desired shape after formation of the conductive coating; and
    forming the polymeric coating over the conductive coating on the bent substrate.

8. The method of claim 1, wherein the conductive coating has a sheet resistance in the range of greater than 0 ohm/square to 1,000 ohms/square.

9. The method of claim 1, wherein the conductive coating has a sheet resistance in the range of greater than 0 ohm/square to 30 ohms/square.

10. The method of claim 1, wherein the conductive coating has a sheet resistance in the range of greater than 0 ohm/square to 15 ohms/square.

11. The method of claim 1, wherein said first metal layer is at least one of heat reflective and radiation reflective.

12. The method of claim 11, wherein the first metal layer includes silver.

13. The method of claim 1, including depositing the conductive coating by a process selected from chemical vapor deposition or physical vapor deposition.

14. The method of claim 13, including depositing the conductive coating by magnetron sputter vapor deposition.

15. The method of claim 1, wherein the polymeric coating has a thickness in the range of 0.2 mils to 1.5 mils.

16. The method of claim 1, including laminating another substrate to the article using the polymeric coating.

17. The method of claim 1, wherein the substrate is non-conductive and the method includes electrically charging the conductive coating to electrodeposit the polymeric coating.

18. The method of claim 1, further including:
    deleting at least a portion of the conductive coating to form a plurality of conductive coating regions; and
    selectively electrically charging one or more of the coating regions to selectively electrocoat the charged coating regions.

19. The method of claim 18, wherein the deleting step includes at least one of masking, laser deletion, mechanical deletion, chemical deletion, or solvent deletion.

20. The method of claim 1, wherein said conductive coating further comprises a primer layer and a second dielectric layer, said primer layer being interposed between said first metal layer and said second dielectric layer.

21. The method of claim 20, wherein said second dielectric layer comprises a third metal oxide layer, a fourth metal alloy oxide layer, and a fifth metal oxide layer, said third metal oxide layer being interposed between said primer layer and said fourth metal alloy oxide layer, and said fourth metal alloy oxide layer being interposed between said third metal oxide layer and said fifth metal oxide layer.

22. The method of claim 21, wherein said third metal oxide layer comprises zinc oxide, said fourth metal alloy oxide layer comprises zinc stannate, and said fifth metal oxide layer comprises zinc oxide.

23. The method of claim 1, wherein said first metal alloy oxide film of said first dielectric layer comprises zinc stannate, and said second metal oxide film of said first dielectric layer comprises zinc oxide.

24. A method of making a coated article, comprising the steps of:
    providing a substrate having at least one conductive coating formed over at least a portion of the substrate, the conductive coating having a thickness in the range of greater than 0 Å to less than 25,000 Å; and forming at least one polymeric coating over at least a portion of the conductive coating by an electrodeposition process, wherein the polymeric coating comprises a cationic acrylic urethane, and wherein the conductive coating functions as an electrode in the electrodeposition process, wherein said conductive coating comprises a first dielectric layer, and a first metal layer, said first dielectric layer being interposed between said substrate and said first metal layer, said first dielectric layer comprising a first metal alloy oxide film and a second metal oxide film, said first metal alloy oxide film being interposed between said substrate and said second metal oxide film, and said first metal alloy oxide film and said second metal oxide film independently selected from the group consisting of oxides of titanium, hafnium, zirconium, niobium, zinc, bismuth, lead, indium, tin, zinc/tin alloy, and combinations thereof, and said coated article is free of a resinous primer.

25. The method of claim 24, wherein the substrate comprises glass.

26. The method of claim 24, wherein the at least one conductive coating is formed by a process selected from chemical vapor deposition or physical vapor deposition.

27. The method of claim 26, including depositing the conductive coating by magnetron sputter vapor deposition.

28. A method of making a coated article, comprising the steps of:

providing a substrate having a plurality of conductive coating regions; and selectively depositing one or more electrodepositable coating materials over the conductive coating regions by an electrodeposition process, wherein each conductive coating region comprises a conductive coating comprising a first dielectric layer, and a first metal layer, said first dielectric layer being interposed between said substrate and said first metal layer, said first dielectric layer comprising a first metal alloy oxide film and a second metal oxide film, said first metal alloy oxide film being interposed between said substrate and said second metal oxide film, and said first metal alloy oxide film and said second metal oxide film independently selected from the group consisting of oxides of titanium, hafnium, zirconium, niobium, zinc, bismuth, lead, indium, tin, zinc/tin alloy, and combinations thereof, and said coated article is free of a resinous primer; and selectively depositing at least one polymeric coating over at least a portion of the conductive coating by an electrodeposition process, wherein the conductive coating regions function as electrodes in the electrodeposition process, wherein the polymeric coating comprises a cationic acrylic urethane, and wherein the conductive coating functions as an electrode in the electrodeposition process.

* * * * *